United States Patent [19]

Winter et al.

[11] Patent Number: 4,551,633
[45] Date of Patent: Nov. 5, 1985

[54] ELECTRONIC GROUNDING SYSTEM FOR ELECTRICAL DISTRIBUTION SYSTEMS

[75] Inventors: David F. Winter, Kirkwood; William K. Dick, St. Louis, both of Mo.

[73] Assignee: ITT Corporation, New York, N.Y.

[21] Appl. No.: 508,060

[22] Filed: Jun. 24, 1983

[51] Int. Cl.⁴ .......................... H04B 3/28; A01J 3/00
[52] U.S. Cl. ...................................... 307/147; 307/5; 119/14.08
[58] Field of Search ................. 307/54, 75, 77, 147, 307/5; 361/42, 43, 47–50; 119/14.03, 14.08; 330/195, 196, 260

[56] References Cited

U.S. PATENT DOCUMENTS

| | | | |
|---|---|---|---|
| 3,760,298 | 9/1973 | Pell | 361/42 X |
| 4,355,595 | 10/1982 | Ackerman et al. | 119/14.03 |
| 4,401,055 | 8/1983 | Street et al. | 119/14.03 |

*Primary Examiner*—A. D. Pellinen
*Assistant Examiner*—Derek S. Jennings
*Attorney, Agent, or Firm*—James B. Raden; William J. Michals

[57] ABSTRACT

A grounding system for grounding the neutral conductor of an electrical distribution system. A point of reference potential with respect to true earth ground potential is provided. An amplifier has a first input connected to the reference potential and a second input connected to the grounded neutral conductor. The amplifier provides an output signal indicative of the difference between the undesired stray voltage on the grounded neutral conductor and the reference potential. The amplifier develops the output signal across the secondary winding of an output transformer. One terminal of the output transformer is connected to the grounded neutral conductor of the distribution system. The other output terminal of the transformer is connected to true earth ground by way of an auxiliary ground path having a finite resistance. The grounding system thus reduces the magnitude of the neutral-to-earth voltage, including transient variations thereof, to a value approaching, or more nearly equal to, true earth ground potential.

13 Claims, 9 Drawing Figures

ELECTRONIC GROUNDING SYSTEM FOR ELECTRICAL DISTRIBUTION SYSTEMS

BACKGROUND OF THE INVENTION

This invention relates to a grounding system for electrical distribution systems and, more particularly, to a grounding system which develops a compensating voltage which reduces the stray voltage on the grounded neutral conductor to a value approaching, or more nearly equal to, true earth ground potential.

High-voltage distribution systems in rural, commercial and residental areas are normally connected to the user by way of a step-down service transformer the secondary of which is connected to a service entrance. Typically, the secondary of the transformer in a single phase system provides a pair of live or "hot" conductors and a center-tapped, neutral conductor. The neutral conductor is connected to the grounding terminal block at the service entrance. The grounding terminal block is then grounded in proximity to the service entrance by way of a ground electrode or ground rod in the earth. These grounding circuits are inherently resistive due to the resistivity of the soil, the finite resistance in the secondary neutral conductor, the ground rod cable and the grounding electrode itself. Any current which flows through the resistance of the grounding circuit develops a so-called "stray voltage" across the resistance which is greater than "0"—i.e., the value of true earth ground potential. The current which develops this stray voltage is attributable to loads on the user's site as well as other loads on the high voltage power distribution system. This stray voltage may reach values that are a hazard to humans and equipment in the case of commercial and residental users, and to both humans and animals in the case of rural or farm users.

This problem is perhaps best exemplified by dairy milking parlor installations wherein the stray voltage adversely affects the milk production and health of the milk cows. It has been reported that a stray voltage of less than 0.5 volts generally does not present a problem to livestock such as cows. A stray voltage in the range of 0.5 to 1.5 volts adversely affects the cows and a stray voltage in excess of 1.5 volts is considered a serious problem. It has been reported that cows which are subjected to the stray voltage on the grounded neutral conductors of the farm electrical distribution system produce less milk. This can subject the cow to a disease known as mastitis which makes the milk unfit for human consumption and can result in the cow's death.

This stray voltage problem is also present in other commercial and residential applications. For example, the stray voltage can deleteriously effect electronic devices such as computers and other sensitive equipment.

In the prior art, the stray voltage problem in dairy barn situations has been dealt with by providing extensive grounding systems such as metallic floor grids which are connected to the grounded neutral terminal. However, this solution presents a so-called "entry problem" wherein the cows are nevertheless subjected to the stray voltage as they step into the barn and onto the grid. Other proposed solutions have included elaborate "super grounds" wherein the resistance to true earth ground has been reduced by using a more extensive grounding circuit. However, these techniques have suffered with inherent limitations on the ability to reduce the magnitude of the neutral-to-earth voltage particularly in installations where the neutral conductor current is relatively high and/or the system impedance is relatively low. That is, with respect to the latter, a low system impedance is more difficult to shunt with additional grounding devices. Both of these prior art systems have the disadvantages that they are difficult and expensive to install.

These and other disadvantages are overcome by the present invention wherein a grounding system is provided which, in effect, provides a simulated ideal ground electrode or an "electronic ground rod" for grounding the neutral terminal of an electrical distribution system.

SUMMARY OF THE INVENTION

Briefly, a grounding system for reducing the magnitude of stray voltage on the grounded neutral conductor of an electrical distribution system is provided. The voltage, which is attributable to the system resistance between the grounded neutral conductor and true earth ground, is reduced to a value approaching and more nearly equal to true earth ground potential. The system comprises means for providing an auxiliary ground circuit which is coupled between the grounded neutral conductor and the true earth ground. This circuit provides a finite resistance path between the grounded neutral conductor and true earth ground. Means are provided for developing and serially coupling a compensating voltage between the grounded neutral conductor and the finite resistance. The compensating voltage is substantially equal to the stray voltage times the ratio of finite resistance divided by the system resistance.

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1:
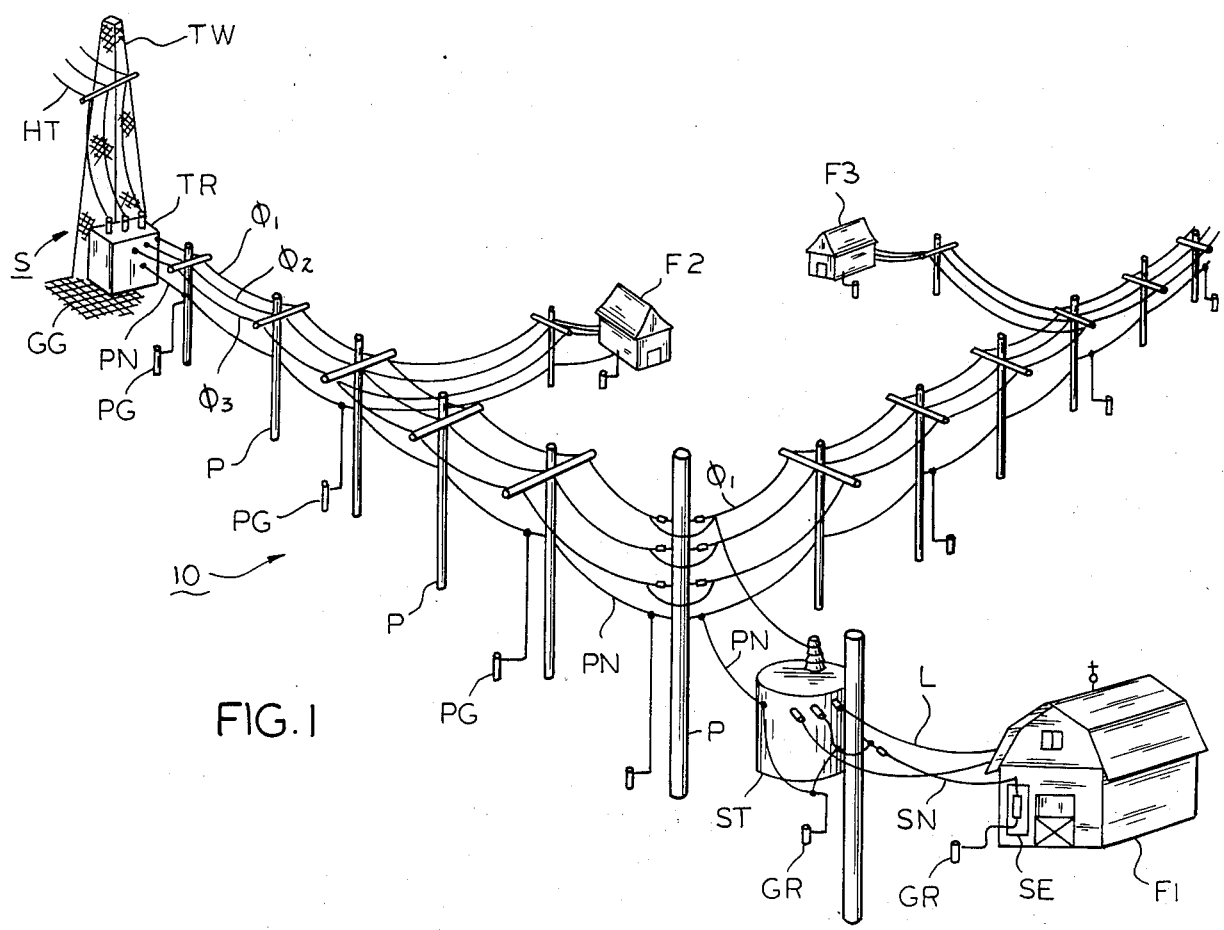
FIG. 1 is a site plan view of a rural power distribution system including a secondary transformer and a barn service entrance connection.

Referring now to FIG. 1 there is shown generally at 10 a typical rural power distribution system as would be used to provide electrical service to farms F1, F2 and F3. The high tension HT wires of the primary power distribution system are dropped from a power transmission line TW to the transformer TR of a substation S. The output of transformer TR is provided on three conductors $\phi_1$, $\phi_2$ and $\phi_3$ which are carried by utility poles P. The neutral output is provided on a primary neutral conductor PN which is also carried by utility poles P. The neutral output is also grounded at substation S by means of a grounding grid GG which is embedded into the earth. The primary neutral conductor PN is also grounded at periodic points along the power distribution system by utilizing a plurality of pole ground rods PG. These ground rods function to keep the potential of conductor PN as near true earth ground potential as possible. Single-phase power is provided to farm F1 by way of a service transformer as illustrated at ST. Farms F2 and F3 are serviced by three-phase power transformers. The single-phase input $\phi_1$ is connected to the primary winding of the transformer as is primary neutral conductor PN. The secondary output of the service transformer is connected to the service entrance SE of the barn at farm F1 by conductors L1 and L2 as is the secondary neutral conductor SN. The neutral conductor is grounded at the transformer by means of a ground rod GR and the grounded neutral terminal at service entrance SE is further grounded by means of a ground rod GR. It can be seen that primary neutral conductor PN is connected to secondary neutral conductor SN.

Figure 2:
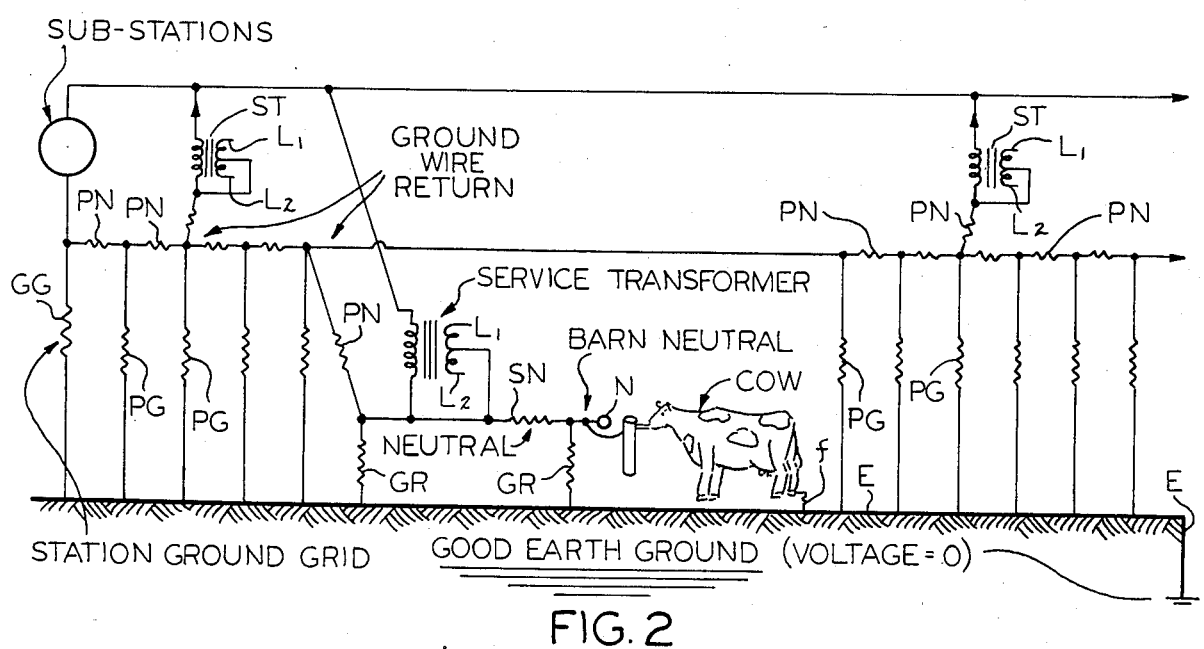
FIG. 2 is a schematic view of the electrical distribution system illustrated in FIG. 1.

Referring now to FIG. 2 there is shown a diagrammatic circuit representation of the electrical distribution system of FIG. 1. Since neutral conductor PN is not a perfect conductor, a finite ground wire resistance is developed and is represented at PN in FIG. 2 as the distributed resistance of the wire between the respective utility pole grounds. The finite ground rod and soil resistance at each of the grounded utility poles P is illustrated as resistance PG in FIG. 2. Similarly, the ground rods at the service transformer pole and the service entrance provide resistances which are diagrammatically illustrated in FIG. 2. It also can be seen that the primary neutral and secondary neutral wire connecting the transformer likewise provide finite resistances illustrated at PN and SN in FIG. 2. The cow illustrated in FIG. 2 is coupled between the barn neutral and true earth ground by way of a finite resistance f. The barn neutral conductor is represented as circuit point N and the points of true earth ground potential (zero volts) are represented at E. As will be described in detail with reference to FIGS. 3 and 4, the various finite resistances developed in the ground wire and ground rods develop a voltage at the barn neutral by virtue of the currents flowing through the various accumulated resistances.

Figure 3:
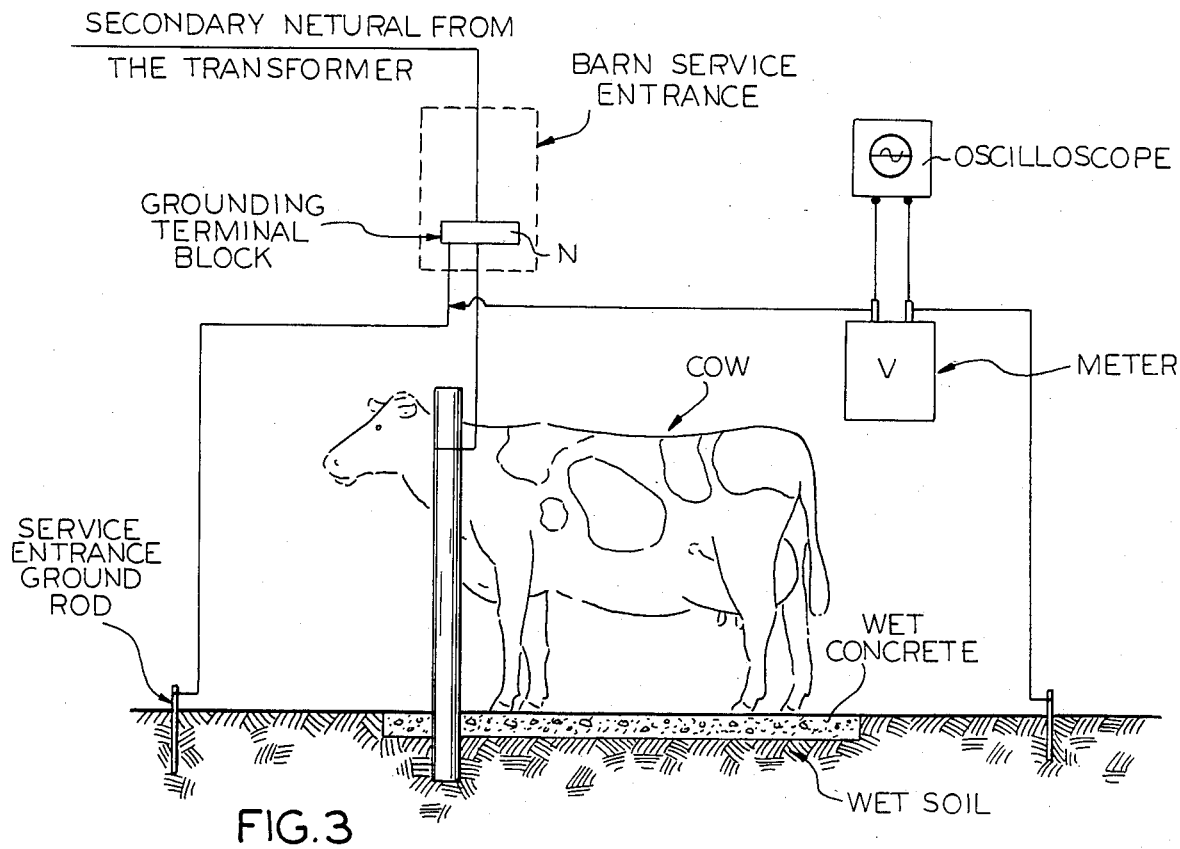
FIG. 3 is a combined pictorial and diagrammatic view of electrical service entrance of a typical dairy barn installation.

Referring now to FIG. 3 there is shown a combined diagrammatic and pictorial view of the service entrance circuit in conjunction with a dairy barn installation which is used to stall milk cows. The cow illustrated in FIG. 3 is effectively connected to the grounding terminal block of the barn service entrance by means of an adjacent stanchion at its stall. The stanchion is typically metallic and is connected to the grounding terminal block for conventional grounding purposes. The animal may also be in contact with terminal block by way of a metallic feeding bin or by the milking machine itself. That is, even though the typical plumbing of a milking machine comprises glass or plastic materials, the cow can be electrically connected to the grounded stationary metallic portions of the milking machine by way of the milk being taken from the cow. As illustrated in FIG. 3, the stray voltage developed at the grounding terminal block can be measured by means of a volt meter which is connected between the grounding terminal block and an isolated reference ground rod. In a typical dairy barn installation the legs, such as the hind legs, of the cow can be more directly connected to true earth ground by way of the moisture and wet concrete and soil in the adjacent areas. Accordingly, the cow can be electrically shocked by the stray current passing through its body to the wet concrete and soil adjacent to its rear hooves.

Figure 4:
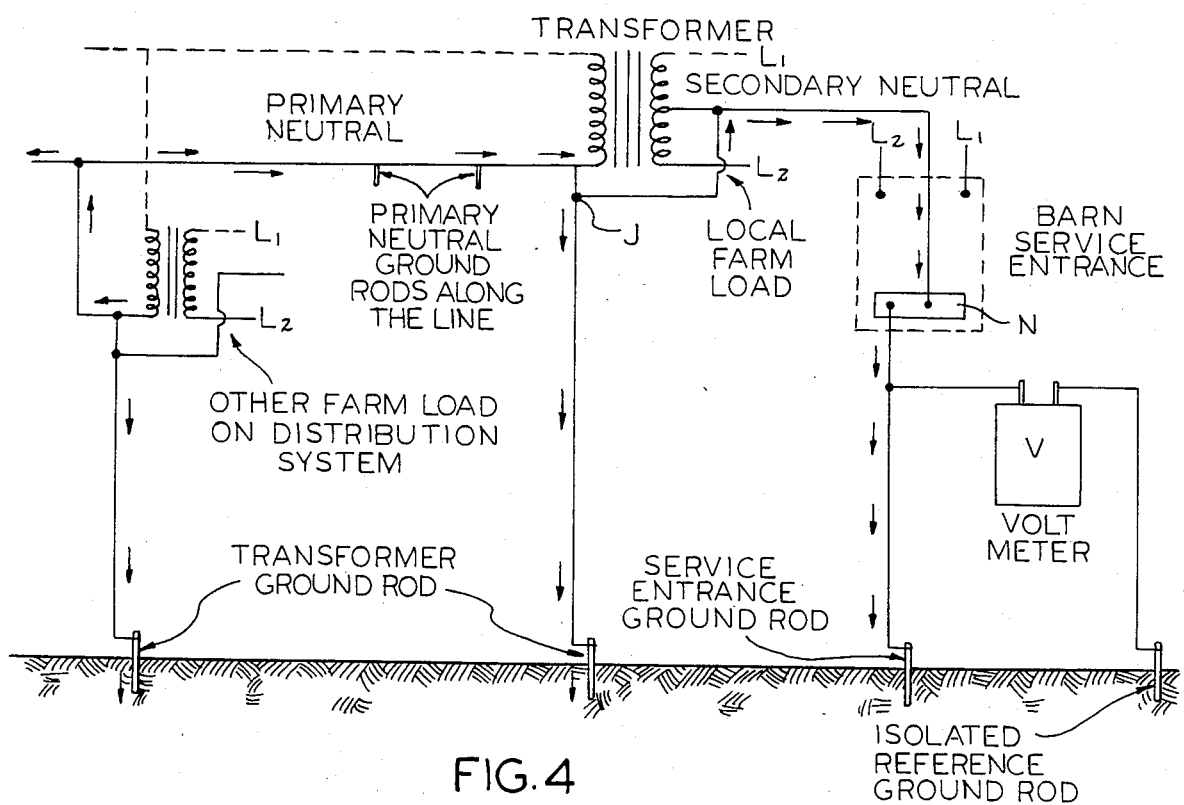
FIG. 4 is a schematic view of the primary and secondary circuits of a electrical distribution system.

Referring now to FIG. 4 there is shown a schematic diagram of a portion of the electrical distribution system and the service transformer at a typical farm installation. The direction of the arrows shown on the primary neutral side of the transformer illustrates the current which flows through the primary neutral as a result of other farm loads on the same power distribution line. This current divides at the junction J of the primary and secondary neutral conductors and therefore a current flows through the local grounding circuit to earth. These currents develop a stray voltage on the local grounding terminal block even if no power is being consumed at the local farm. Likewise, any increasing loads from another service transformer on the same farm results in a greater current flow through the finite resistance of the ground rod circuit at the service entrance. It should now be appreciated that the local grounding circuit is electrically in parallel with all other grounding circuits in the system and, in essence, the local grounding circuit is inextricably coupled to and influenced by the entire electrical distribution system. Finally, any load at the local service entrance also develops a stray voltage on the local grounding terminal.

Figure 5A:
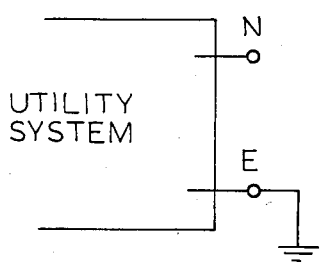
FIGS. 5a and 5b are block and equivalent circuit diagrams of a typical grounded neutral conductor circuit.
Figure 5B:
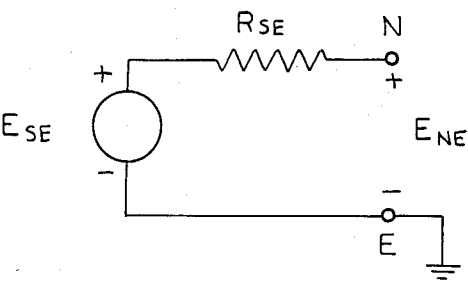

Referring now to FIGS. 5a and 5b there are shown block and idealized equivalent circuit diagrams, respectively, of a typical grounded neutral conductor circuit. The grounding terminal of the neutral conductor of the service entrance is illustrated as circuit point N. The other terminal E illustrated in FIGS. 5a and 5b represents true earth ground and therefore true earth ground potential. The block in FIG. 5a represents the utility system between the barn neutral conductor N and true earth ground. FIG. 5b is the equivalent circuit of the grounded neutral conductor circuit. The system resitance $R_{SE}$ of the installation is represented by a resistor and the stray voltage developed between the neutral to true earth is represented by $E_{SE}$ having the designated polarities illustrated in FIG. 5b. In actual practice, the system resistance $R_{SE}$ may be determined by means of a ground resistance meter which can be a bridge-balanced, hand-held device and is well known in the art. The system resistance is typically on the order of 1 to 3 ohms but can be on the order of several ohms. The stray voltage $E_{SE}$ is measured by means of an oscilloscope or a conventional voltmeter coupled between the barn neutral grounding terminal and a reference ground such as a ground rod spaced apart from the service entrance ground rod. The voltage between true earth ground E and point N is represented by $E_{NE}$ which is the voltage from neutral to earth and is the maximum stray voltage impressed across the cow.

Figure 6:
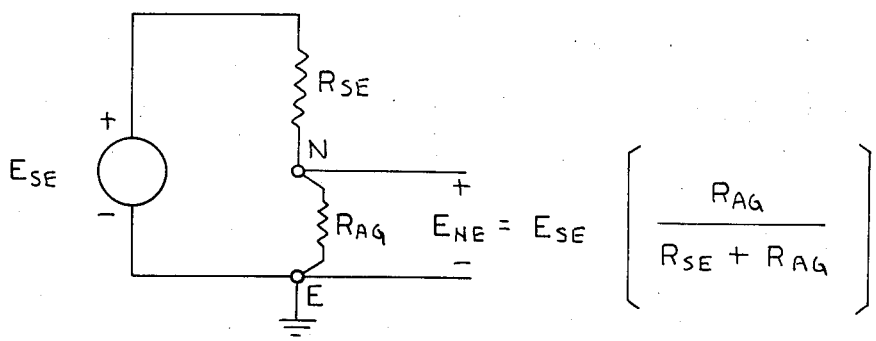
FIG. 6 is an equivalent circuit of the grounded neutral conductor circuit in conjunction with additional or auxiliary grounding paths.

Referring now to FIG. 6 there is shown an idealized equivalent circuit diagram similar to the diagram of FIG. 5b and which further illustrates the effect of adding an additional or auxiliary ground $R_{AG}$ between point N and true earth ground E. It can be seen that the effect of this additional ground is to reduce the voltage $E_{NE}$ by the ratio of the auxiliary ground resistance $R_{AG}$ divided by the sum of the system resistance $R_{SE}$ and the auxiliary ground resistance $R_{AG}$. In actual practice, the auxiliary ground resistance $R_{AG}$ can be provided by driving one or more additional ground rods into the earth and connecting them to point N of the grounding terminal block. However, since this additional auxiliary ground circuit also exhibits a finite resistance, which typically is on the order of ½ to 10 ohms, the degree to which the voltage $E_{NE}$ can be reduced is limited. It should now be appreciated that in order to reduce the voltage $E_{NE}$ at point N to 0 volts, or true earth ground potential, a perfect conductor or dead, "crow-bar" short circuit would have to be placed between terminals N and E of FIG. 6. Since this generally can not be done with known or conventional ground rods and grounding techniques, the dilemma is to provide such a perfect conductor or "crow-bar" short across N—E notwithstanding the physical limitations and finite resistances of the rear world. This problem is solved, in accordance with the principles of the present invention, with the system diagrammatically illustrated in FIG. 7 and schematically illustrated in FIG. 8.

Figure 7:
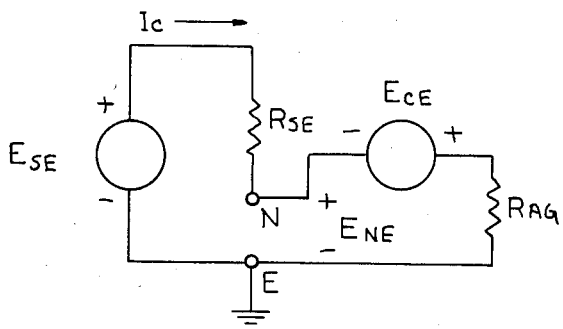
FIG. 7 is a diagram of the compensating system in accordance with the present invention.

Turning now to FIG. 7, it can be seen that, in accordance with the present invention, an additional or compensating voltage source $E_{CE}$ is provided and is serially coupled between point N and auxiliary resistance $R_{AG}$. Source $E_{CE}$ is poled in series additive relation with respect to the indicated polarity of stray voltage $E_{SE}$, as indicated in FIG. 7. In actual practice, the magnitude of the stray voltage $E_{SE}$ is measured as hereinbefore described. The value of system resistance $R_{SE}$ is measured with a ground resistance meter as previously described. This, then, defines a compensating current $I_C$ which is equal to $E_{SE}$ divided by $R_{SE}$. If a perfect conductor or "crow-bar" short were applied across N—E, the voltage or IR drop across resistance $R_{SE}$ would equal the magnitude of the stray voltage $E_{SE}$, and point N would be at 0 volts or true earth ground potential and therefore $E_{NE}=0$. In accordance with the present invention, the magnitude and phase of the compensating voltage $E_{CE}$ is selected such that the current flow through the serial combination of $E_{SE}$, $R_{SE}$, $E_{CE}$ and $R_{AG}$ is equal to $I_C$. This, then, provides a current flow through point N which is equivalent to the current which would flow were point N short-circuited to E by means of a perfect conductor. Thus, the neutral-to-earth voltage at point N is reduced to a value equal to 0 volts or true earth ground potential.

The following summarizes the calculation of the required compensation voltage $E_{CE}$ given the system parameters for the stray voltage $E_{SE}$, the system resistance $R_{SE}$ and the auxiliary ground resistance $R_{AG}$:

Applying Ohm's Law the compensating current is $$I_C = E_{SE}/R_{SE} \text{ amperes} \tag{1}$$

the voltage drop across $R_{AG}$ is $$E_{CE} = I_C R_{AG} \text{ volts} \tag{2}$$

substituting (1) into (2) provides $$E_{CE} = (E_{SE})/R_{SE})R_{AG} \text{ volts} \tag{3}$$

or $$E_{CE} = E_{SE}(R_{AG})/(R_{SE}) \text{ volts} \tag{4}$$

and the power requirements are determined by $$P = E_{CE}^2/R_{AG} \text{ watts or } P = (E_{SE}^2)/R_{SE})(R_{AG}/R_{SE}) \text{ watts.}$$

Figure 8:
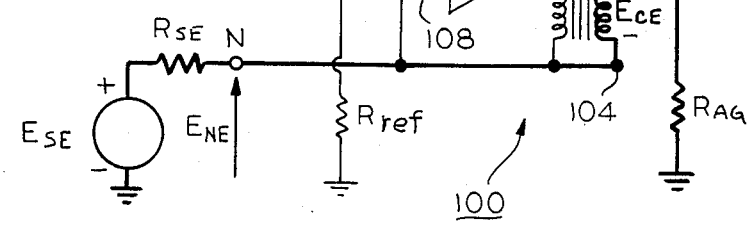
FIG. 8 is a schematic diagram of a preferred embodiment of the present invention.

Referring now to FIG. 8 there is shown a combined block and schematic diagram of a constructed embodiment of an electronic circuit system 100 in accordance with the principles of the present invention. System 100 of FIG. 8 includes an A.C. amplifier 102 having an output connected to the primary winding of an output transformer 104. The secondary winding of transformer 104 includes a first terminal 104a connected to the auxiliary ground resistance $R_{AG}$. A second output terminal 104b is connected to terminal N of the barn grounding connector. Amplifier 102 includes a first signal input 106 which is connected to a point of reference potential, with respect to true earth ground potential E, as by way of an isolated reference ground rod $R_{ref}$. Amplifier 102 includes a second signal input 108 which is connected to point N of the barn grounding terminal. Amplifier 102 provides a given gain K which can be adjustable or self-adjusting. Amplifier 102 compres the signals at its input to provide an amplified output signal indicative of the difference between the input signals.

The amplifier illustrated in FIG. 8 is an A.C. amplifier having a transformer output. However, the function provided by this exemplary element can be provided by any one of a number of suitable devices for developing and serially coupling a compensating voltage in accordance with the present invention. In currently preferred practice, amplifier 102 comprises a direct-coupled, wide-band amplifier having minimal phase shift characteristics. This type of amplifier accommodates D.C., the normal power frequencies (e.g., 60 hertz), and the frequencies of the various transients which also may appear on the stray voltage. The gain of amplifier 102 is selected such that, or is increased until, the resulting voltage between points N and E in FIG. 7 approaches 0 volts or is nearly equal to true earth ground potential. It has been found the gain should be limited to an amount which nevertheless provides a small input signal or $\Delta V$ to the amplifier. That is, if the voltage at point N were held at exactly 0 volts, there would not be detectable input signal. In one constructed embodiment of the present invention, the neutral-to-earth voltage $E_{NE}$ was reduced and held to 0.01 volts.

An example of the system parameters of a one installation is as follows:

The measured system resistance $R_{SE}$ was on the order of 2 ohms. The measured stray voltage $E_{SE}$ was found to be as high as 15 volts for certain transient variations of $E_{SE}$. This, then, requires and $I_C=E_{SE}/R_{SE}$ or 15 divided by 2 = 7.5 amperes. The measured resistance of the auxiliary ground circuit $R_{AG}$ was on the order of 1 ohm. Accordingly, the calculated value of the required $E_{CE}$ was 7.5 volts. If, in this example, $R_{AG}$ were 5 ohms, and the other parameters remain the same as above, then $E_{CE}=37.5$ volts.

It is believed that the effect of providing a auxiliary ground circuit and a source of compensating voltage, in accordance with the present invention, is to provide a reflected auxiliary ground impedance at point N which essentially is equal to $R_{AG}$ divided by the gain K of the amplifier, or $R_{AG}/K$. Thus, using the equation of FIG.

6, the effect of the reflected impedance on the neutral-to-earth voltage can be represented as follows:

$$E_{NE} = \frac{E_{SE}\left(\frac{R_{AG}}{K}\right)}{\left(\frac{K+1}{K}\right) R_{SE} + \left(\frac{R_{AG}}{K}\right)}$$

The required wattage of the amplifier also can be readily calculated by the well-known expression $E_{CE}$ squared divided by $R_{AG}$, or $E_{CE}^2/R_{AG}$. The auxiliary ground circuit is typically provided by utilizing one or more ground rods drive into the earth at points separated from the service entrance. This location is selected so as to remove the relatively higher voltages provided by the amplifier to a protected area. The impedance of the auxiliary ground circuit is not limited to a purely resistive impedance; it also can be a capacitive or inductive reactance, or any combination of the three.

While the instant invention has been described with reference to a dairy barn system, it also should be appreciated that the system can be utilized with other farm applications such as a pig pen where the animals come in contact with feeding bins, water trough and other metallic objects which are connected to the service entrance grounding terminal. It should further be noted that the present invention can be utilized in multiple phase electrical distribution systems such as a three-phase system. In such systems, if the loads are perfectly balanced, no load current flows through the primary neutral conductor. However, even a slight imbalance can result in a significant neutral current and therefore a stray voltage. Additionally, third harmonic excitation currents will produce a stray voltage on the neutral conductor. Thus, the present invention also is applicable to such multi-phase systems. It will also be appreciated by those skilled in the art that the present system finds application in many other electrical systems such as for the production of sensitive electronic equipment including computers and industrial control devices. The present invention also finds utility in both A.C. and D.C. systems, and in applications where the relative voltage between two points, which are under the influence of an electric field or leakage current, must be reduced to avoid undesirable results. One example is to alter or reduce the induced voltage on a piece or equipment to avoid or minimize galvanic corrosion.

What has been taught is an electronic grounding system for electrical power distribution systems. The system facilitates, notably, the reduction of neutral-to-earth voltages, including transient variations thereof, on the neutral conductor of the electrical distribution system to a value approaching that of, and nearly equal to, true earth ground potential. The form of the invention illustrated and described herein is but a preferred embodiment of these teachings in the form currently preferred for manufacture. It is shown as an illustration of the inventive concepts, however, rather than by way of limitation, and it is pointed out that various modifications and alterations may be indulged in within the scope of the appended claims.

What is claimed is:

1. A voltage compensating system for reducing the magnitude of stray voltage, with respect to true earth ground potential, on the grounded neutral conductor of an electrical distribution system, said system comprising:
   means for providing a point of reference potential with respect to said ground potential;
   amplifying means having a first input connected to said means and a second input for connection to said grounded neutral conductor for providing an output signal indicative of the difference between said stray voltage and said reference potential, said amplifying means having an output terminal adapted for connection to an external circuit and having output means for coupling said output signal between said second input and said output termnal; and,
   means connecting between said output terminal and said true earth ground for providing an auxiliary ground path therebetween.

2. A method for reducing the magnitude of stray voltage, with respect to true earth ground potential, on the grounded neutral conductor of an electrical distribution system, said method comprising the steps of:
   providing a point of reference potential with respect to said ground potential;
   providing an input signal indicative of the difference between said stray voltage and said reference potential;
   amplifying said input signal to provide an output signal;
   serially connecting said output signal between an auxiliary ground path to said earth ground and said grounded neutral conductor; and,
   adjusting the amplification of said input signal to reduce the magnitude of said stray voltage to a given level near said grounded potential.

3. An electronic ground wire system for electrically grounding the grounded neutral conductor of an electrical distribution system comprising in combination:
   means for providing a point of reference potential with respect to earth ground potential;
   amplifying means having a first input connected to said means and a second input for connecting to said grounded neutral conductor for providing an output signal indicative of the difference between the voltage on said grounded neutral conductor and said reference potential, said amplifying means having output means for coupling said output signal between first and second main electrodes with said first main electrode being adapted for connection to said grounded neutral conductor; and,
   means connected between said second main electrode and said earth ground for providing an auxiliary ground path therebetween.

4. The system according to claim 3, wherein said output means is the secondary winding of a transformer.

5. A grounding system for reducing the magnitude of stray voltage on the grounded neutral conductor of an electrical distribution system, which stray voltage is attributable to the system resistance between said grounded neutral conductor and true earth ground, to a value approaching and more nearly equal to true earth ground potential, said grounding system comprising:
   means for providing a point of reference potential with respect to true earth ground potential;
   means for providing an auxiliary ground circuit coupled between said grounded neutral conductor and said true earth ground and providing a finite impedance path therebetween; and,
   means responsive to the difference between said reference potential and the magnitude level of said stray voltage for developing and serially coupling a compensating voltage between said grounded neutral conductor and said finite impedance, said compensating voltage being substantially equal to said stray voltage times the ratio of said finite resistance divided by said system resistance.

6. A grounding system for reducing the relative magnitude of stray voltage on the grounded neutral conductor of an electrical distribution system, which stray voltage is attributable to the system impedance between said grounded neutral conductor and true earth ground, to a value approaching and more nearly equal to true earth ground potential, said grounding system comprising:
- means for providing a point of reference potential with respect to true earth ground potential;
- means for providing an auxiliary ground circuit coupled between said grounded neutral conductor and said true earth ground and providing a finite impedance path therebetween; and,
- means responsive to the difference between said reference potential and the magnitude level of said stray voltage for developing and serially coupling a compensating voltage between said grounded neutral conductor and said finite impedance to reduce the magnitude of said stray voltage to said value.

7. A method for reducing the magnitude of stray voltage on the grounded neutral conductor of an electrical distribution system, which stray voltage is attributable to the system resistance between said grounded neutral conductor and true earth ground, to a value approaching and more nearly equal to true earth ground potential, said method comprising the steps of:
- measuring the system resistance between said grounded neutral conductor and said true earth ground;
- measuring said stray voltage;
- providing an auxiliary ground circuit coupled between said grounded neutral conductor and said true earth ground to provide a finite impedance path therebetween; and,
- developing and serially coupling a compensating voltage between said grounded neutral conducgtor and said finite impedance to reduce the magnitude of said stray voltage to said value.

8. The method according to claim 7, including the step of adjusting said compensating voltage in response to variations of said stray voltage.

9. The method according to claim 8, wherein said compensating voltage is proportional to said stray voltage over a range of variations of said stray voltage.

10. The method according to claim 7, wherein said compensating voltage causes a current to flow through said system resistance and said auxiliary ground circuit which is substantially equal to said stray voltage divided by said system resistance.

11. The method according to claim 7, wherein said providing step includes placing at least one ground electrode into the earth at a point spaced apart from said grounded neutral conductor.

12. A method for reducing the magnitude of stray voltage on the grounded neutral conductor of an electrical distribution system, which stray voltagre is attributable to the system resistance between said grounded neutral conductor and true earth ground, to a value approaching and more nearly equal to true earth ground potential, said method comprising the steps of:
- providing an auxiliary ground circuit coupled between said grounded neutral conductor and said true earth ground to provide a finite impedance path therebetween; and,
- developing and serially coupling a compensating voltage between said grounded neutral conductor and said finite impedance to reduce the magnitude of said stray voltage to said value.

13. A voltage compensating system for reducing the relative magnitude of stray voltage, with respect to true earth ground potential, on a grounded element associated with an electrical system, said compensating system comprising:
- means for providing a point of reference potential with respect to true earth ground potential;
- means for providing an auxiliary ground circuit coupled between said grounded element and true earth ground and providing a finite impedance path therebetween; and,
- means responsive to the difference between said reference potential and the magnitude level of said stray voltage for developing and serially coupling a compensating voltage between said grounded element and said finite impedance to reduce the relative magnitude of said stray voltage.

* * * * *

UNITED STATES PATENT AND TRADEMARK OFFICE
CERTIFICATE OF CORRECTION

PATENT NO. : 4,551,633
DATED : November 5, 1985
INVENTOR(S) : D.F. Winter - W.K. Dick It is certified that error appears in the above—identified patent and that said Letters Patent is hereby corrected as shown below:

Col. 3, Line 37, change "resistance" to --resistances--.

Col. 6, Line 25, change "compres" to --compares--.

Col. 6, Line 51, delete "a".

Col. 9, Line 36, change "the" to --said--.

Col. 10, Line 18, change "voltagre" to --voltage--.

[SEAL]

Signed and Sealed this

Twenty-fifth Day of March 1986

Attest:

Attesting Officer

DONALD J. QUIGG

Commissioner of Patents and Trademarks